US011783650B2

(12) United States Patent
Balák et al.

(10) Patent No.: US 11,783,650 B2
(45) Date of Patent: Oct. 10, 2023

(54) METHOD AND SYSTEM FOR ACCESS CONTROL USING SHORT-RANGE WIRELESS COMMUNICATIONS

(71) Applicant: Axis AB, Lund (SE)

(72) Inventors: Zdenek Balák, Prague (CZ); David Nemec, Prague (CZ)

(73) Assignee: AXIS AB, Lund (SE)

( * ) Notice: Subject to any disclaimer, the term of this patent is extended or adjusted under 35 U.S.C. 154(b) by 57 days.

(21) Appl. No.: 17/537,503

(22) Filed: Nov. 30, 2021

(65) Prior Publication Data

US 2022/0198851 A1 Jun. 23, 2022

(30) Foreign Application Priority Data

Dec. 22, 2020 (EP) ..................................... 20216504

(51) Int. Cl.
*G07C 9/00* (2020.01)
*H04W 76/30* (2018.01)
*H04W 76/10* (2018.01)

(52) U.S. Cl.
CPC ........ *G07C 9/00309* (2013.01); *H04W 76/10* (2018.02); *H04W 76/30* (2018.02)

(58) Field of Classification Search
None
See application file for complete search history.

(56) References Cited

U.S. PATENT DOCUMENTS

| | | | |
|---|---|---|---|
| 10,666,453 B2 * | 5/2020 | Kim | ...................... H04L 67/025 |
| 2017/0294061 A1 | 10/2017 | Shin et al. | |

FOREIGN PATENT DOCUMENTS

| | | |
|---|---|---|
| CN | 110602703 A | 12/2019 |
| EP | 3477600 A1 | 5/2019 |
| WO | 2015/023737 A1 | 2/2015 |
| WO | 2017/120004 A1 | 7/2017 |
| WO | 2020/117796 A1 | 6/2020 |

\* cited by examiner

*Primary Examiner* — K. Wong
(74) *Attorney, Agent, or Firm* — XSENSUS LLP (57) ABSTRACT

A method for handling a radio-frequency connection between a control unit and a mobile device of an access control system. The mobile device is connected to the control unit using radio-frequency signal communication. The method comprises obtaining an indication of a first event generated in the access control system in response to a first request for the control unit to arrange to carry out an action. After a release of the connection by the control unit, the method further comprises obtaining an indication of whether or not a second event has been generated in the access control system in response to a second request for the control unit to arrange to carry out the action. The method further comprises determining, based on the indication of whether or not the second event has been generated, whether or not to allow the mobile device to re-connect to the control unit.

16 Claims, 7 Drawing Sheets

METHOD AND SYSTEM FOR ACCESS CONTROL USING SHORT-RANGE WIRELESS COMMUNICATIONS

CROSS-REFERENCE TO RELATED APPLICATION

This application claims priority to European Patent Application No. 20216504.9 filed on Dec. 22, 2020, the entire disclosure of which is incorporated by reference herein.

TECHNICAL FIELD

Embodiments herein relate to a method and system for access control using short-range wireless communications. In particular, they relate to handling a radio-frequency connection between a control unit and a mobile device of an access control system comprising the control unit and one or more mobile devices. A corresponding computer program and a computer program carrier are also disclosed

BACKGROUND

A system using short-range wireless communications for access control usually comprises a control unit and a mobile device. The short-range wireless communication between the mobile device and the control unit may e.g. be performed via Bluetooth, Bluetooth Low Energy (BLE), Zigbee, Wifi, Radio-frequency identification (RFID), etc. A current solution of access control in, e.g. a door-station, using Bluetooth wireless communications is a one-to-one solution where a secure Bluetooth connection between the control unit and the mobile device is setup after the mobile device user has pressed a button on the door-station or on the mobile device. The connection time is then up to 10 s, which makes the opening process far longer than opening the door with an RFID badge and reader.

There are also other products using Bluetooth access control solution with a one-to-one secure connection, where for example, a mobile device connects automatically when in reach of a hello message sent out from a door station. As an additional password to a door opening command, the user moves the mobile device in a predetermined pattern sensed by a motion sensor in the mobile device. When the movement pattern is correct, the mobile device sends an ok to the door station that opens the door.

EP3477600A1 discloses a method for controlling access in a system comprising a portable device associated with a user and an access control device. The portable device and the access control device are configured to wirelessly communicate with each other. The method compares received signal strength over time with a previously determined reference signal strength profile. By determining the signal strengths over time and by comparing them with the determined reference signal strength profile, it is possible to differentiate between a first situation where a user is approaching his office door with the intention to enter into the office space and a second situation where the user is approaching his office door with the intention to go past it in the corridor. The method also compares motion sensor data with a reference value. A movement pattern of the portable device is used to obtain a more accurate timing for controlling the access control device to avoid or at least reduce undesirable delay or waiting time for the user.

WO2015/023737 discloses a wireless access control system including a remote access device and an electronic lock. The electronic lock communicates with the remote access device. The electronic lock controls the ability to lock and unlock a door in which the electronic lock is disposed. The electronic lock determines when the remote access device is at a distance less than or equal to a predetermined distance from the lock to enable the lock to be unlocked. In one of the embodiments, in order to determine that a remote access device is actually in position to access a lock, the wireless access control system determines the radio signal strength of an access request from the remote access device. The controller at the remote access device determines whether the radio signal strength is greater than a predetermined value. If yes, then a signal is sent from the wireless access control system to the remote access device. The remote access device determines the radio signal strength of the signal from the wireless access control system and permission to control the lock is only granted if the remote access device determines that the remote signal strength of the signal from the wireless access system is above a predetermined threshold.

However, there are problems related to multiple users of an access control system. For example, there may be more mobile devices that try to connect to the control unit than the control unit can handle.

Moreover, the present solutions for access control either have limited security features or relatively slow response. For examples, some solutions use Received Signal Strength Indicator (RSSI) threshold value to determine the proximity to an access unit and then give access to anyone who is in the close proximity. Some solutions omit RSSI monitoring at all and just give access to anyone who press a button of an access application (app) in the mobile device.

SUMMARY

Considering the above it is an object of embodiments herein to provide an improved method and system for access control with regarding to multiple users, security and response time.

According to one aspect of embodiments herein, the object is achieved by a method performed in an access control system. The access control system may be a system controlling access to physical or logical areas or resources.

The method is for handling a radio-frequency connection between a control unit and a mobile device of the access control system. The access control system comprises the control unit connected to one or more mobile devices using radio-frequency signal communication. The control unit may control access to the physical area or logical areas or resources in response to a generated event. For example, the control unit may control the access by performing an action in response to a request given by a user of a mobile device. In some embodiments the action to be carried out is to give access to a physical resource, such as opening any type of lock, e.g. locking a door, a lid, a window or the like. In some other embodiments the action is to give access to a logical resource, such as a database, the content of a logical area or a protected device.

A respective access application is installed on the one or more mobile devices. The access application communicates with the control unit and may arrange for the mobile device to perform actions in response to the communication with the control unit.

The request for the action to be carried out may be given by a user of a mobile device located close by the control unit. For example, the request may be given by the user of the mobile device through the access application installed on the mobile device, or on a web page accessed from a browser presented on the mobile device. In another scenario, the request may for instance be given by pressing a button or touching a touch screen on or at the control unit, by engaging an IR detector located on or at the control unit, or by making a noise detected by a microphone on or at the control unit. The request may be given anonymously. The request may be a command to get access to the physical area, to the content of the logical area, to the protected device or to the protected resource controlled by the control unit.

The request may be given both by a user who is authorized to instigate the action but also by someone who is not. Having a mobile phone that is connected to the control unit may in itself mean that the user is authorized to instigate the action, or having a mobile phone that is connected may be only a first level of authorization leading to that a check of a second level of authorization (allowed to instigate the action or not) is started.

The user of the mobile device may be the person or the object carrying the device. The user of the mobile device may have an access right related to the resource controlled by the control unit. The user of the mobile device may be positioned physically close to the mobile unit when the method is carried out.

The method comprises obtaining an indication of a first event generated in the access control system in response to a first request for the control unit to arrange to carry out an action.

After a release of the connection by the control unit, the method further comprises obtaining an indication of whether or not a second event has been generated in the access control system in response to a second request for the control unit to arrange to carry out the action.

The method further comprises determining, based on the indication of whether or not the second event has been generated, whether or not to allow the mobile device to re-connect to the control unit.

According to a further aspect of embodiments herein, the object is achieved by an access control system configured to perform the above method. The access control system comprises a control unit and a mobile device which is configured to be connected to the control unit using radio-frequency signal communication. The mobile device may for example be automatically connected to the control unit when in reach of the control unit.

In some embodiments herein, when a mobile device has been connected to the control unit, a secure communication channel has been established between the mobile device and the control unit. Further, the connection of the mobile device may mean that the mobile device have been pre-authorized, i.e. the user of the mobile device is authorized, to instigate an action and the user of the mobile device is an authorized user of the service by the control unit. The authorization leads to that the control unit arranges to carry out the request that the mobile user requests. However, automatic connection may also purely setup a communication channel, while all security requests, authorizations and encryptions, may be handled later on when requested.

The mobile device may be any one of a mobile phone, a tablet, a laptop, a key fob, a smart watch or a smart bracelet.

The control unit may be any unit controlling access to a physical area, a logical area, a protected device, or a protected resource.

A request for an action to be carried out, e.g. a door opening command, may for instance be given by pressing a button or touching a touch screen on or at the control unit. Further, a request may be given both by a user who is authorized to instigate the action, but also by someone who is not authorized to instigate the action, e.g. a user of an uncertified or not pre-authorized, and not paired or bonded mobile device, or even a user without a mobile device or a user with a mobile device but without an access app. A request may also be given by a user of a paired, but not connected mobile device, which may happen when the maximum number of connections to the control unit has been reached.

According to further aspects, the object is achieved by a computer program and a computer program carrier corresponding to the aspects above.

When the control unit registers an event, or obtains an indication of an event which is a result of a request given by someone, the control unit may determine to release at least one radio-frequency connection between a connected mobile device and the control unit to enable other mobile devices, which may be paired or bonded to the control unit, to connect to the control unit, since the request may e.g. be given by a user of a paired but not connected mobile device. By releasing at least one connection, unconnected mobile devices are able to connect to the control unit and allow the respective user to instigate the action by requesting it.

By determining whether or not to allow the mobile device to re-connect to the control unit based on the indication of whether or not the second event has been generated it is possible to manage more connections to the control unit than the maximum number of connections. Further, it is possible to determine whether or not the mobile device is associated with the second event by allowing the mobile device to reconnect to the control unit after the second event has been generated. Specifically, if there is a back-off time for re-connection, e.g. for automatic re-connection, then embodiments herein allow the mobile device to reconnect before the back-off time, if the second event has been generated, such that it is possible to determine whether or not the mobile device is associated with the second event.

By determining whether or not the mobile device is associated with the second event the access control system may determine whether or not to carry out a requested action in response to a request.

Thus, the embodiments herein provide an improved method and system for access control with regarding to multiple users, security and response time.

BRIEF DESCRIPTION OF THE DRAWINGS

Examples of embodiments will be described in more detail with reference to attached drawings in which.

DETAILED DESCRIPTION

Figure 1A:
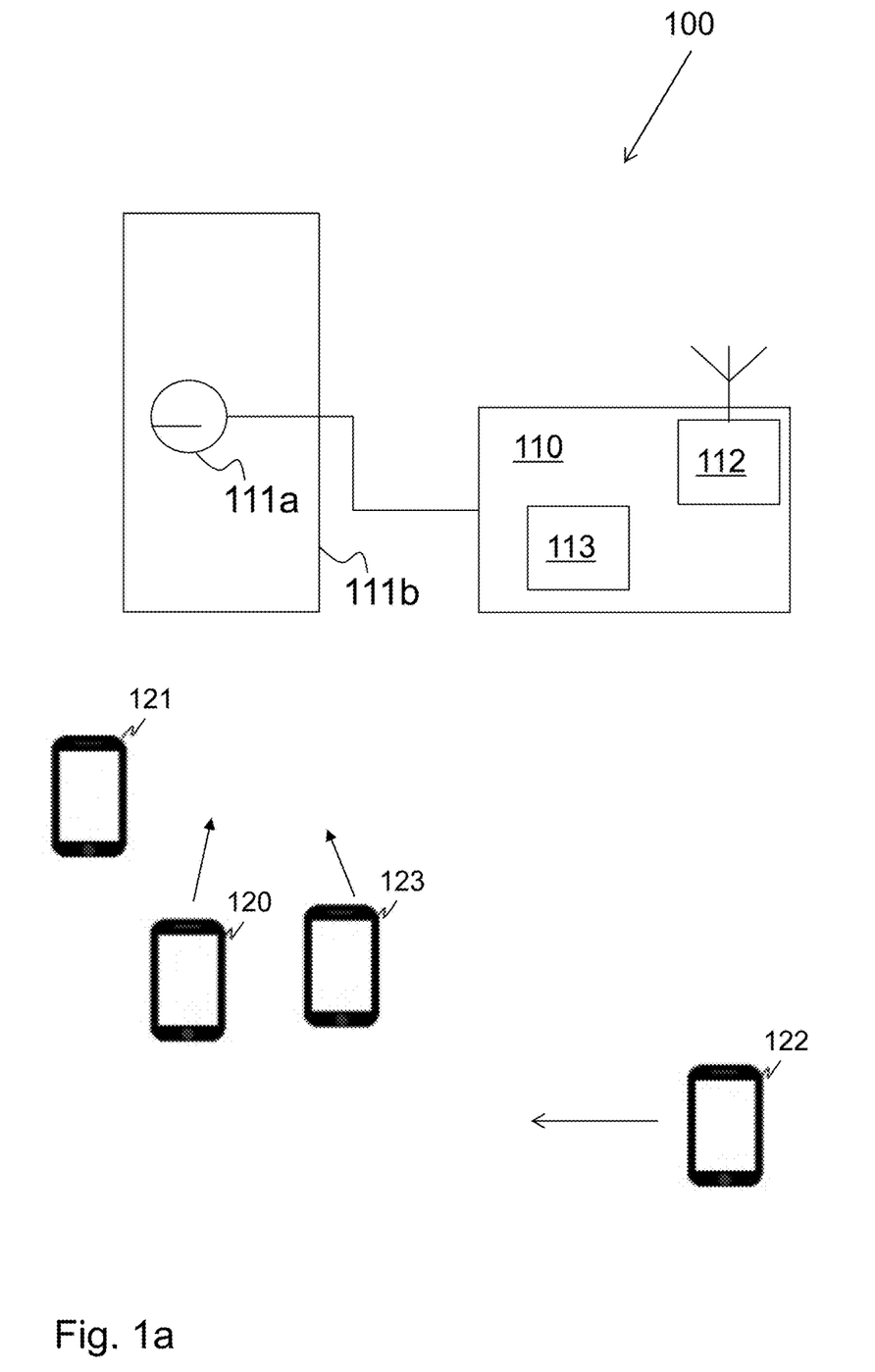
FIG. 1a is block diagram illustrating an access control system in which embodiments herein may be implemented.
Figure 1B:
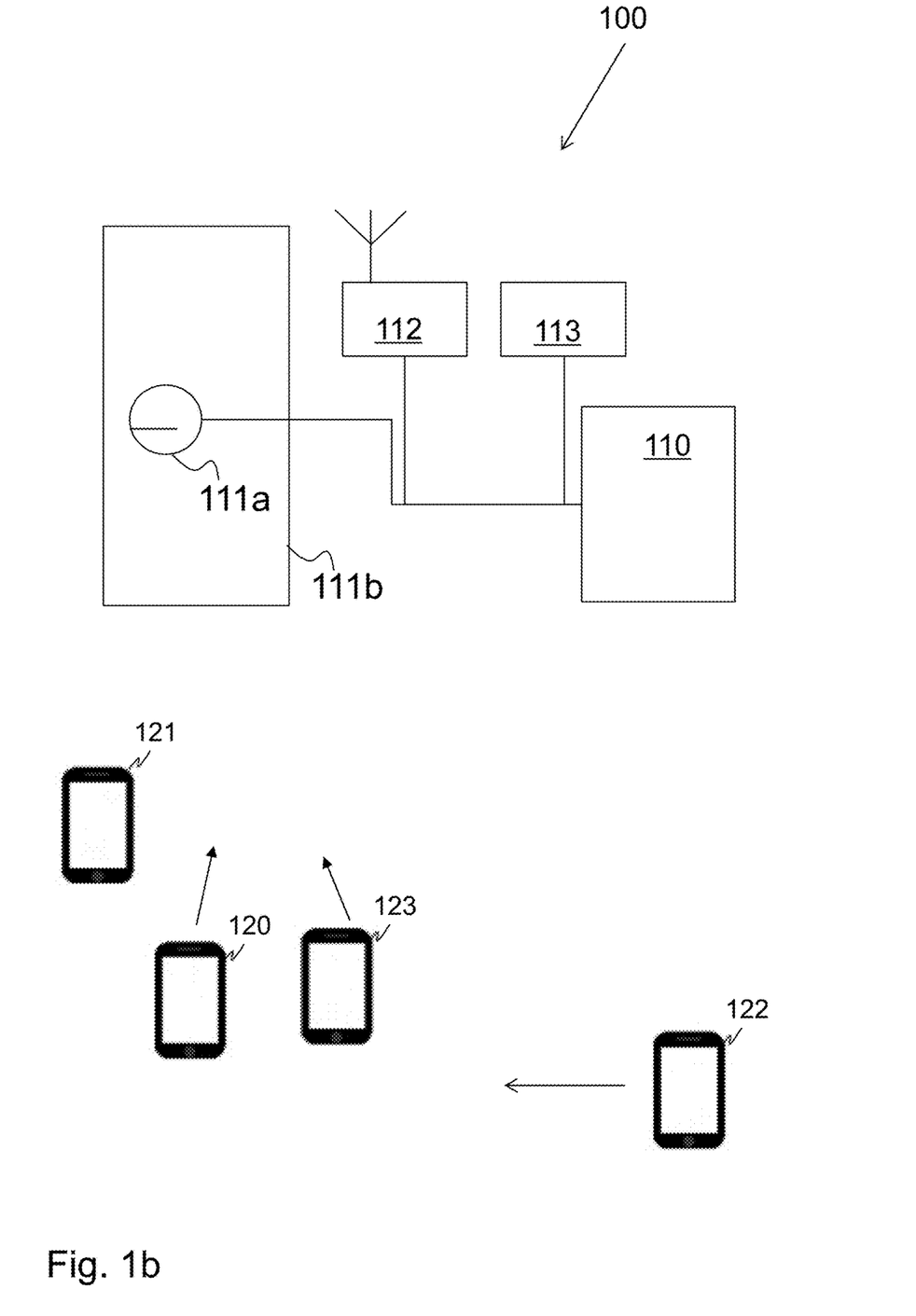
FIG. 1b is block diagram illustrating a further access control system in which embodiments herein may be implemented.

FIGS. 1*a* and 1*b* are block diagrams illustrating two embodiments of an access control system 100 in which embodiments herein for handling a radio-frequency connection between a control unit and a mobile device of the access control system 100 may be implemented.

As shown in both FIG. 1*a* and FIG. 1*b*, the access control system 100 comprises a control unit 110 which is exemplified as a door station for controlling access to a physical area, e.g. opening/unlocking or keeping any type of lock, e.g. a lock 111*a* of a door 111*b*, a lid, a window or the like, closed and/or locked in response to a generated event.

However, the control unit 110 may be any unit for controlling access to a logical area, a logical resource, such as a database, a protected device or a protected resource in response to the event. The control unit 110 may for example give or deny access to a database or content of a logical area, to a protected device or to a protected resource. The protected device may for example be a safe, a vehicle or a printer. For controlling access to a physical area, the control unit 110 may for instance be an intelligent door station, a simple keypad, a card-reader or a command-receiver-by-the-door connected to a remotely located intelligent access control device. The control unit 110 has wireless short-range communication functionality for communicating with one or more mobile devices using radio-frequency signal communication and may comprise a radio-frequency transceiver 112 as shown in FIG. 1*a*. The control unit 110 may further comprise a request receiving unit 113, e.g. a button to press, a touch screen, an IR detector, or a microphone as also shown in FIG. 1*a*. The request receiving unit 113 may generate the event which triggers the control unit 110 to control the access in response to a request by a user of the access control system 100. The request may for example be given by touching a virtual button on a touch screen. The control unit 110 may further comprise an activating unit which may arrange to carry out a requested action, and a memory and a processor, which are not shown in FIG. 1*a*, nor FIG. 1*b*. In embodiments illustrated in FIG. 1*b*, the radio-frequency transceiver 112 and the request receiving unit 113 are external to the control unit 110 and connected to the control unit 110. In some embodiments the radio-frequency transceiver 112 and the request receiving unit 113 should be close to each other in order to carry out embodiments described herein. This is for example the case when measurements of received signal strength of signals transmitted from the radio-frequency transceiver 112 are used to determine whether or not a mobile device is associated with an event generated by the request receiving unit 113. Close to each other may for example mean that the distance between these two units should not be greater than a resolution, or an average positioning error, of the measurements of the received signal strength. Such average positioning errors may e.g. be in the order of one to five meters for state-of-the-art BLE solutions.

The control unit 110 may further be connected, e.g. wirelessly or by wire, to the door 111*b*, or as illustrated in FIGS. 1*a* and 1 *b* to the lock 111*a* of the door 111*b*. The control unit 110, the radio-frequency transceiver 112 and the request receiving unit 113 may each be arranged close to an object, such as the lock 111*a* of the door 111*b* that is controlled by the access control system 100. However, it is not necessary that the control unit 110 is physically close to the radio-frequency transceiver 112 or the request receiving unit 113. Nor is it necessary that the radio-frequency transceiver 112 and/or the request receiving unit 113 is physically close to the controlled area or device. This may for example be the case when the control unit 110 controls access to a logical area or logical resource.

The access control system 100 further comprises one or more connected mobile devices 120-122 illustrated in FIGS. 1*a* and 1*b*. In addition to the connected mobile devices 120-122 FIGS. 1*a* and 1*b* also shows an unconnected mobile device 123 which is in the vicinity of the access control system 100. FIGS. 1*a* and 1*b* further illustrates a respective arrow pointing away from some of the connected mobile devices 120-122, and from the unconnected mobile device 123. The respective arrow illustrates a direction of motion of the respective mobile device 120-123. One of the mobile devices is not associated with an arrow, which means that this mobile device is stationary, i.e. its velocity is zero. Each of the connected mobile devices 120-122 may be e.g. a mobile phone, a laptop, a tablet, a key fob, a smart watch, or a smart bracelet. A user of a mobile device may request access to the physical area, to the content of the logical area, to the protected device or to the protected resource. Each connected mobile device 120-122 also has wireless short-range communication functionality for communicating with the control unit 110 using radio-frequency signal communication and may comprise a transceiver, a memory and a processor. Each of the connected mobile devices 120-122 is associated with a user.

The short-range wireless communication between the respective mobile device 120-122 and the control unit 110 may e.g. be performed via Bluetooth, BLE, Zigbee, Wifi, RFID, Ultra WideBand (UWB), FeliCa, ANT+, Z-Wave, or via infrared communication or ultrasound communication.

Mobile devices, such as the connected mobile devices 120-122, may be automatically connected to the control unit 110 when in reach of the control unit 110. Some examples of when a mobile device is in reach of the control unit 110 is when the mobile device detects or receives a Hello message sent by the control unit 110 using Bluetooth; or when the distance between the respective mobile device and the control unit 110 is shorter than a threshold distance, e.g. 1 m, which could be measured using a location service, Global Positioning System (GPS) or indoor position system. Distance measuring may also be achieved by analysis of characteristics of the radio communication e.g., via Time of Flight, or some other method combining such analysis with phase difference. Such distance measuring could for example be implemented with UWB. Motion sensor data of a mobile device may also be used to determine when the respective mobile device connects automatically to the control unit 110. For example, if a first mobile device 120 is still, or its motion sensor data is below a threshold, or if it is moving away from the control unit 110 etc., then it does not automatically connect to the control unit 110 according to some embodiments.

In embodiments herein several mobile devices 120-122 may be connected simultaneously to the control unit 110. Since the connected mobile devices 120-122 have already established connections (which may be time consuming) at the time of the event, the control unit 110 is able to communicate with the connected mobile devices 120-122 directly after the event in order to determine which connected mobile device 120-122 that is related to the generation of the event and whether or not to carry out the requested action. This may make the reaction to the event generation quicker. However, a pre-pairing step is optional and may depend on a type of RF communication used. One way of solving the connection step is a pairing process, which may be described as a setup arrangement to achieve authorization to allow automatic connection. This pairing is not necessarily an authorization for any further action.

Another way of solving the connection step is to carry out the connection authorization each time a mobile device is close enough to the control unit 110, but still before the user of the mobile device generates the event by the request.

As mentioned above, when automatically connected to the control unit 110, the respective connected mobile device 120-122 may be bonded or paired to the control unit 110 by a pairing process. When two devices pair up, they may share their addresses, names, and profiles, and usually store them in memory. They may also share a common secret key, which allows them to bond or pair whenever they're together in the future.

Pairing usually requires an authentication process where a user must validate the connection between devices. The flow of the authentication process varies and usually depends on the interface capabilities of one device or the other.

The following is an example of pairing process for a door station:
  The door station sends encryption keys and authorization identity (ID) to a mobile device;
  The user launches a mobile access app in the mobile device and enters pairing mode;
  In the pairing mode, the mobile app scans for door stations that can be paired;
  The user selects correct door station and enters pairing PIN code. Pairing PI Ns are generated by the door station and must be somehow provided to the user. Any known paring method is applicable for the selected RF communication method.
  Encryption keys and authorization ID are exchanged after the door station validates the pairing PIN. It is the authorization ID of the mobile device that contains the access right, e.g. to open the door.

After this pairing process, the mobile device is bonded or paired to the door station. The mobile device may start with the following pre-authorization process when in reach of the door station:
  Connecting to the door station;
  Establishing a secure communication channel with the door station using encryption keys received during pairing.

If the pairing, i.e. the authorization, is not done before the automatic connection, it may be done either at the time of the connection, or at the time of the request, e.g. when the button is pressed and the control unit 110 has determined who pressed it. This may for example be the case when the control unit 110 makes an authorization call to an access right database.

In some embodiments herein no pairing and no authorization and no encryption keys at all are used. Instead, a mobile device may connect when in reach of the control unit 110, and then any security checks are done following the event.

When devices connect to each other in e.g. a piconet of Bluetooth, it's known there is a master-slave relationship between two devices. One of the devices is the master and the other devices are slaves. According to some embodiments herein, the control unit 110 may act as a master, and according to some other embodiments the respective connected mobile device 120-122 may act as the master.

In order to demonstrate a method for handling a radio-frequency connection between the control unit 110 and one of the connected mobile devices 120-122 according to the embodiments herein, an example scenario of access control to a physical area where the radio frequency communication is BLE, Bluetooth Low Energy, is described in relation to FIG. 1*a* in the following.

The control unit 110, in the form of a BLE enabled door station controlling the access to a door 111*b*, e.g. to a project office room, is located within an office environment. In the office environment there are several mobile devices 120-122, in the form of mobile telephones, with access apps, all paired to the door station 110 and having valid certificates, e.g. valid pre-authorization with verification that access right to the project office room is granted. In the office environment there are also mobile devices with access apps that are not paired to the door station, i.e. without a valid certificate and therefore with no access right to the project office room. The mobile devices 120-122 may be carried by users or they may be laying on a desk or in a bag in the office environment.

When in reach of the control unit 110, a paired mobile device 120 may connect automatically to the control unit 110 and a secure communication channel via Bluetooth may be established with the control unit 110. A user of a mobile device may give a request for the control unit 110 to carry out an action, e.g. a door opening command. The request may be implemented by pressing a button or touching a screen comprised in the access control system 100, e.g. on or at the control unit 110, or by any of the other methods mentioned above.

The request may be generated both by a user who is authorized to instigate the action but also by someone who is not, e.g. a user of an uncertified or unauthorized, or not paired or bonded mobile device, or even a user without a mobile device or a user with a mobile device, but without access app. A request at or on the control unit 110 may also be given by a user of a paired, but not connected mobile device, which may happen when the maximum number of connections to the control unit 110 have been reached. If a user of an uncertified or not paired mobile device or a user without mobile device or access app at all, presses the button or touches the screen on the control unit 110, the door should not be opened. If a user of a paired, but not yet connected mobile device presses the button or touches the screen on or at the control unit 110, this request should lead to that the door should be opened.

As mentioned above, there may be limitations on how many simultaneous connections the control unit 110 may have with connected mobile devices 120-122. For example, in a BLE scenario the control unit 110 may be limited to a maximum of seven simultaneous connections. There may also be spare connections, such as an eighth spare connection in BLE. The spare may be available and always open and the maximum number of connections may depend on hardware or software limitations.

After detection of an event, such as an indication of a door opening command on a door station, the control unit 110 may, on request, not get any positive confirmation back from any of the connected mobile devices 120-122, e.g. through communication with their applications. That is the control unit 110 may not be able to determine which one of the connected mobile devices 120-122 (including their applications) that has a corresponding user who gave the door opening command on the door station. Then there may be another user who gave the command. The control unit 110 may then open the spare connection enabling the mobile device (including the application) of this user to connect to the control unit 110.

The control unit 110 may also make a forced disconnect of at least one of the other connections, alternatively all the connections that returned a negative response may be disconnected by force. This may be done to open up a new spare connection.

In order to prohibit a ping-pong effect related to releasing and re-connecting the connections, re-connection of a now disconnected and previously connected mobile device 120 may be prohibited, at least during a time period, such as a prohibit or back-off time period. For example, automatic re-connection may be prohibited during the prohibit time period. A problem arises in such a scenario. For example, after a forced release of the connection of the previously connected mobile device 120 a further request for the control unit 110 to arrange to carry out an action may be given by the user of the previously connected mobile device 120. For example, the user of the previously connected mobile device 120 gives a command to unlock or open the door 111*b*.

However, if the control unit 110 is limited to investigate whether or not to carry out the action in response to the further event based on communication with the now connected mobile devices, the above described problem leads to that the user of the previously connected and now forcedly disconnected mobile device 120 may not only be prohibited from reconnecting to the control unit 110 by the above described method, but the control unit 100 may not be able to determine that it is the user of the disconnected mobile device that gave the request if this is the case. As a consequence, the control unit 110 may not carry out the requested action if it was the user of the disconnected mobile device that gave the request.

In other words, for the previously connected mobile device 120 (including its applications) to be able to reconnect automatically to the control unit 110, there may be a back-off time after which any previously connected mobile device can again freely connect to the control unit 110. However, such a back-off time will stop the user of the previously connected mobile device 120 to request the control unit 110 to arrange to carry out the requested action, e.g. to arrange to open the door, within this back-off time.

Embodiments herein solve the above problem by allowing the previously connected mobile device 120 to re-connect based on an indication of whether or not the second event has been generated. Specifically, the previously connected mobile device 120 is allowed to re-connect during the back-off period if the indication of whether or not the second event has been generated indicates that the second event has been generated. The solution may also include that a previously connected mobile device 120 is not allowed to re-connect during the back-off period if the indication of whether or not the second event has been generated indicates that a second event has not been generated.

The determination as to whether or not to allow the re-connection may be made both by the control unit 110, e.g. after having received a re-connection attempt, and by the previously connected mobile device 120 before the re-connection attempt. By letting the previously connected mobile device 120 make the determination less failed re-connection attempts will be made.

In order for the previously connected mobile device 120 to be able to make a determination as to whether or not to allow the re-connection, such that re-connections attempts are not made when such attempts shouldn't be made, the control unit 110 may send the indication of whether or not the second event has been generated to the previously connected mobile device 120, e.g. in a broadcasted transmission. This may for example be implemented in the form of a value of a counter of events.

Thus, not to stop the user of the previously connected mobile device 120 to request the control unit 110 to arrange to carry out the requested action, e.g. to arrange to open the door, within the back-off time, there is a fail-safe mechanism as described above.

In some embodiments the control unit 110 keeps a counter of number-of-times-the-door-opening-command-has-been-activated. The value of this counter may be sent out together with the Bluetooth hello message.

When the previously connected mobile device 120 is disconnected by force, it may not reconnect until the door opening command counter has been increased, which means not before someone has given the door opening command again, or when a timer corresponding to the back-off time is out.

Figure 2:
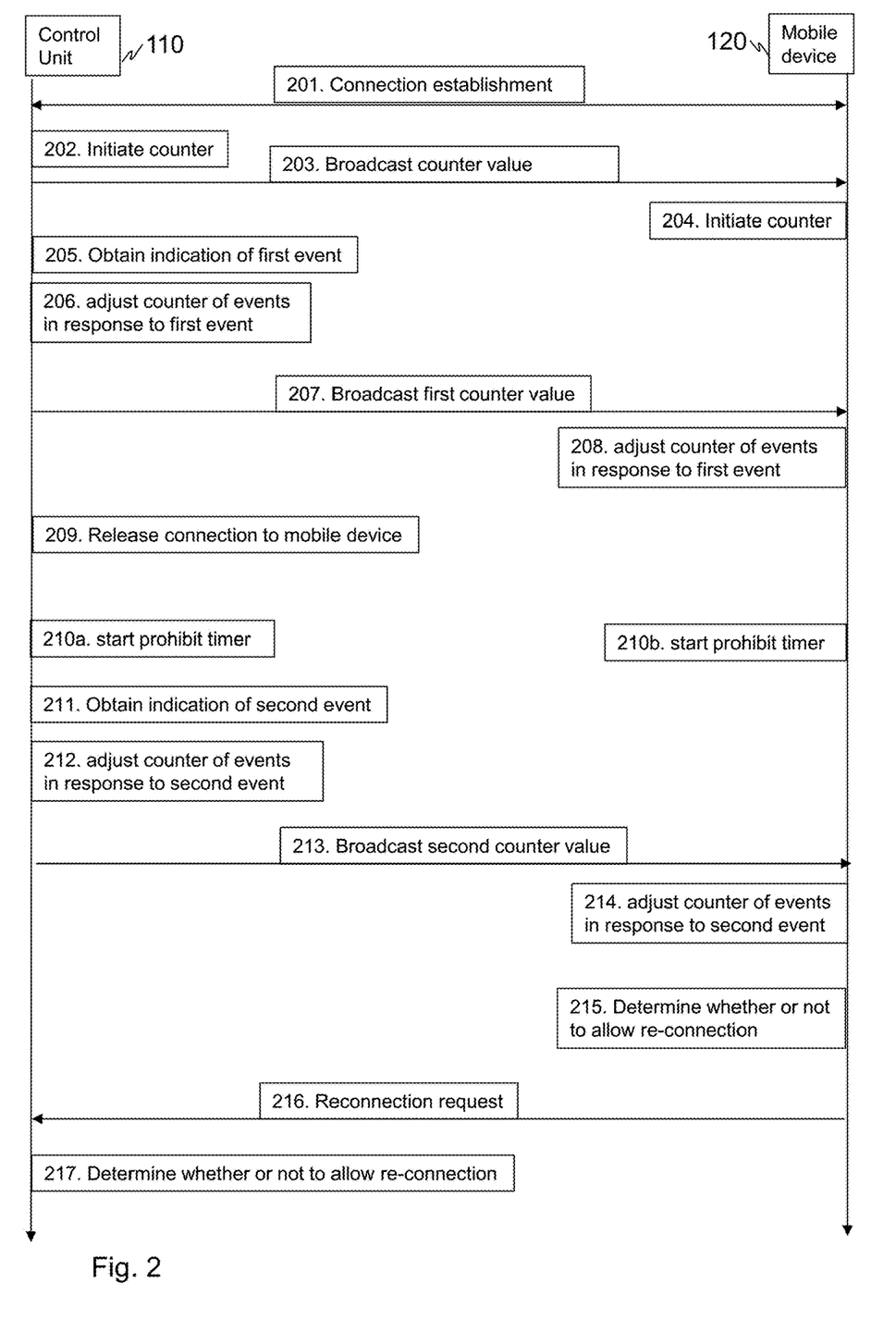
FIG. 2 is a signalling diagram illustrating a method for handling a radio-frequency connection between a control unit and a mobile device of an access control system according to embodiments herein.

In the following, a method solving the above problem will be described in detail with reference to a signaling diagram presented in FIG. 2, and with further reference to the access control system 100 illustrated in FIGS. 1*a* and 1*b*. The signaling diagram of FIG. 2 illustrates the method for handling the radio-frequency connection between the control unit 110 and the connected mobile device 120 of the access control system 100.

The method will be exemplified by referral to Bluetooth terminology, but the method is equally applicable to other radio-frequency communication protocols.

Although the method is described below in relation to the connected mobile device 120 the method may be applied to multiple connected mobile devices 120-122, either in parallel or successively.

As mentioned above, the access control system comprises the control unit 110 connected to the one or more mobile devices 120-122 using radio-frequency signal communication.

One or more of the following actions presented in FIG. 2 may be performed in the following exemplifying order. In other examples, the order may differ from what is described below. The method may comprise the following actions:

Action 201

At some point in time the radio-frequency connection between the control unit 110 and the connected mobile device 120 has been established. In some embodiments herein the connection has been established automatically when the connected mobile device 120 came close enough to the control unit 110 to receive a Hello message.

Action 202

Then, in order for the control unit 110 to be able to let the connected mobile device 120 make the determination as to whether or not to allow a future re-connection when it has been released from the connection, such that re-connections attempts are not made when such attempts shouldn't be made, the control unit 110 may keep track of the number of generated events. The track-keeping may be implemented by a counter of events. The counter of events may be given an initial value at some point in time, e.g. zero.

Action 203

The control unit 110 may broadcast an indication of whether or not an event has been generated. For example, the control unit 110 may broadcast a counter value. The counter value may correspond to the number of events generated.

The indication of whether or not the event has been generated may for example be broadcasted in a Hello message sent by the control unit 110 using Bluetooth.

The connected mobile device 120 may receive the indication of whether or not an event has been generated, e.g. by a broadcasted transmission from the control unit 110. For example, the connected mobile device 120 may receive the counter value.

Action 204

If the connected mobile device 120 has received the indication of whether or not an event has been generated, it may keep track of the number of events generated. For example, the connected mobile device 120 may initiate or update its own counter of events with the received counter value. In other words, the connected mobile device 120 may initiate or update a second counter of events. Thus, the second counter of events may be managed by the connected mobile device 120. In some embodiments the second counter of events corresponds to the counter of events managed by the control unit 110. For example, the values may be the same.

Action 205

The control unit 110 obtains an indication of a first event generated in the access control system 100 in response to a first request for the control unit 110 to arrange to carry out an action.

The event generated in the access control system 100 may be a result of a request given by a user of a mobile device 120 out of one or more mobile devices 120-123.

Action 206

The control unit 110 may adjust the counter of events to the first counter value in response to the first event. Adjusting the counter may for example comprise increasing the counter. The counter may for example be increased by one in response to an event, such as the first event.

Action 207

In some embodiments the connected mobile device 120 obtains the indication of the first event. For example, the control unit 110 may broadcast the first counter value such that it is received by all mobile devices 120-123, including the connected mobile device 120, within reach of the radio-frequency communication used by the control unit 110 when communicating with the connected mobile devices 120-122.

The indication of the first event, such as the first counter value, may for example be broadcasted in a Hello message sent by the control unit 110 using Bluetooth.

In some embodiments the indication of the first event comprises a first counter value corresponding to the first event.

Action 208

The connected mobile device 120 may adjust the counter of events to the first counter value in response to the first event. In some embodiments the connected mobile device 120 increases or decreases the value of the second counter of events. The value of the second counter of events may be increased or decreased with one.

Action 209

The control unit 110 then releases the radio-frequency connection between the mobile device 120 and the control unit 110. In some embodiments the control unit 110 releases the radio-frequency connection between the mobile device 120 and the control unit 110 as a result of the generated first event. For example, in response to the first event the control unit 110 may try to determine which connected mobile device 120-122 that is associated with the first event. If the control unit 110 cannot determine which connected mobile device 120-122 is associated with the first event then as a result of the first event the control unit 110 may release the radio-frequency connection between the connected mobile device 120 and the control unit 110 to enable other mobile devices to be connected to the control unit 110. Releasing the connection may be advantageous since the request may be given by the unconnected mobile device 123. By releasing the connection, the unconnected mobile device 123 is able to connect to the control unit 110 which allows the control unit 110 to verify if it is the user of the previously unconnected mobile device 123 who requested the action to be instigated. Releasing the radio-frequency connection between the connected mobile device 120 and the control unit 110 may mean that the physical radio frequency communication channel between the connected mobile device 120 and the control unit 110 established during the connection process is dropped, released or disconnected. The releasing of the connection may be initiated by the control unit 110, for instance by assigning the physical radio frequency communication channel to another paired mobile device and for instance returning the previously connected mobile device 120 to an unconnected state, depending on situation.

The mobile device 120 may be prohibited from re-connecting to the control unit 110 within a pre-determined time duration from the release of the connection unless the second event has been generated during the pre-determined time duration.

In some embodiments herein the release of the connection by the control unit 110 is performed in response to not being able to determine which connected mobile device out of one or more connected mobile devices 120-122 that is associated with the event.

In some further embodiments herein the release of the connection by the control unit 110 is performed if the number of connected mobile devices is larger than a maximum number of mobile devices allowed to connect to the control unit 110 simultaneously.

In yet some further embodiments herein the release of the connection by the control unit 110 is performed in response to not being able to determine which connected mobile device out of one or more connected mobile devices 120-122 that is associated with the event if the number of connected mobile devices is larger than a maximum number of mobile devices allowed to connect to the control unit 110 simultaneously. That is a combination of the above embodiments is possible. For example, the control unit 110 may send out requests to the one or more connected mobile devices 120-122 requesting them to respond with indications of whether or not they are associated with the event. Then the control unit 110 may release the connection if the number of connected mobile devices is larger than the maximum number of mobile devices allowed to connect to the control unit 110 simultaneously and the control unit 110 only receives negative responses or does not get any response.

In some embodiments the control unit 110 may release any of the connections, e.g. one or more connections, between the control unit 110 and the connected mobile devices 120-122.

The control unit 110 may select the radio-frequency connection between the connected mobile device 120 and the control unit 110 to be released by selecting a connection to be released among one or more connections between the control unit 110 and the one or more connected mobile devices 120-122 based on which connection that was established first.

In some other embodiments the at least one connection to be disconnected could be selected based on an analysis of distance and motion of the connected mobile devices 120-122, such that connected mobile devices that are further away and/or not moving are disconnected first.

Action 210a

The control unit 110 may start a prohibit timer in response to the release of the connection to the previously connected mobile device 120. The prohibit timer may also be referred to as a back-off timer. If the prohibit timer is used and has ran out the previously connected mobile device 120 is allowed to re-connect, e.g. by automatic re-connection when it is able to communicate with the control unit 110. For example, the previously connected mobile device 120 may be allowed to automatically re-connect once it receives a hello message from the control unit 110.

Action 210b

Also the previously connected mobile device 120 may start a prohibit timer in response to the release of the connection to the previously connected mobile device 120.

Action 211

After the release of the connection by the control unit 110, the control unit 110 obtains an indication of whether or not a second event has been generated in the access control system 100 in response to a second request for the control unit 110 to arrange to carry out the action. For example, the control unit 110 may obtain an indication that the second event has been generated in the access control system 100 in response to a second request for the control unit 110 to arrange to carry out the action. For example, the user of the previously connected mobile device 120 may have given a command to open the door 111b at request receiving unit 113.

Action 212

The control unit 110 may adjust the counter of events to a second counter value in response to the second event, i.e. if the second event has been generated.

Action 213

In some embodiments the previously connected mobile device 120 obtains the indication of the second event. For example, the control unit 110 may broadcast the indication of whether or not the second event has been generated. The control unit 110 may broadcast the indication of whether or not the second event has been generated in response to the second request for the control unit 110 to arrange to carry out the action.

In correspondence, obtaining the indication of whether or not the second event has been generated may then comprise receiving, by the previously connected mobile device 120, the indication. Thus, the indication of whether or not the second event has been generated may be received in the broadcasted message from the control unit 110, When the indication of the second event comprises the counter value corresponding to the second event, then broadcasting the indication of whether or not the second event has been generated comprises broadcasting the second counter value.

The indication of the second event, such as the second counter value, may for example be broadcasted in a Hello message sent by the control unit 110 using Bluetooth.

Action 214

The previously connected mobile device 120 may adjust the counter of events to the second counter value in response to the second event, i.e. if the second event has been generated. That is, the previously connected mobile device 120 may adjust the second counter of events, i.e. the counter of the mobile device 120, to the second counter value in response to the obtained indication of the second event. For example, the previously connected mobile device 120 may adjust the counter of events to the second counter value if it receives the counter value, such as the second counter value, from the control unit 110 that differs from the first counter value stored in the previously connected mobile device 120.

Action 215

In some embodiments the previously connected mobile device 120 then determines based on the indication of whether or not the second event has been generated, whether or not to allow the mobile device 120 to re-connect to the control unit 110.

Determining whether or not to allow the mobile device 120 to re-connect to the control unit 110 may comprise determining, by the mobile device 120, whether or not to send the connection request. The connection request may be a re-connection request.

In some embodiments determining whether or not to allow the mobile device 120 to re-connect to the control unit 110 is further based on a comparison of a time duration from the release of the connection with a pre-determined time duration from the release of the connection. The pre-determined time duration from the release of the connection may for example be the back-off time or the prohibit time which indicates the time during which the previously connected mobile device 120 is prohibited from re-connecting to the control unit 110. The determining may be performed within the pre-determined time. Once the pre-determined time has elapsed the previously connected mobile device 120 may be free to re-connect, e.g. without taking into account the indication of whether or not the second event has been generated.

The previously connected mobile device 120 determines to allow the mobile device 120 to re-connect to the control unit 110 if the indication of whether or not the second event has been generated indicates that the second event has been generated.

When the indication of the second event comprises the counter value corresponding to the second event then determining whether or not to allow the mobile device 120 to re-connect to the control unit 110 comprises determining, based on the value of the counter of events, to allow the mobile device 120 to re-connect to the control unit 110 if the value of the counter of events has been adjusted to the second counter value. For example, the mobile device 120 may determine to allow the mobile device 120 to re-connect to the control unit 110 if the value of the counter of events has increased e.g., to the second counter value. In some embodiments the mobile device 120 determines to allow the mobile device 120 to re-connect to the control unit 110 if the value of the counter of events has increased by at least one.

Action 216

In some embodiments the control unit 110 receives the connection request from the mobile device 120. The connection request may be received within the pre-determined time from the release of the connection Action 217

In some embodiments the control unit 110 determines, based on the indication of whether or not the second event has been generated, whether or not to allow the mobile device 120 to re-connect to the control unit 110. For example, the control unit 110 may determine whether or not to allow the mobile device 120 to re-connect to the control unit 110 when it receives the connection request from the mobile device 120. In some embodiments the previously connected mobile device 120 connects to the control unit 110 and the control unit 110 disconnects the mobile device 120 again by force.

In some embodiments determining whether or not to allow the mobile device 120 to re-connect to the control unit 110 is further based on the comparison of the time duration from the release of the connection with the pre-determined time duration from the release of the connection. The determining may be performed within the pre-determined time, which may be the back-off or prohibit time mentioned above. Once the pre-determined time has elapsed the previously connected mobile device 120 may be free to re-connect.

The control unit 110 determines to allow the mobile device 120 to re-connect to the control unit 110 if the indication of whether or not the second event has been generated indicates that the second event has been generated. The second event may have been generated within the pre-determined time.

When the indication of the second event comprises the counter value corresponding to the second event then determining whether or not to allow the mobile device 120 to re-connect to the control unit 110 comprises determining, based on the value of the counter of events, to allow the mobile device 120 to re-connect to the control unit 110 if the value of the counter of events has been adjusted to the second counter value.

Action 217 correspond to action 215 above, and the control unit 110 may determine to allow the mobile device 120 to re-connect to the control unit 110 based on the same or similar conditions as described above for the mobile device 120.

Figure 3:
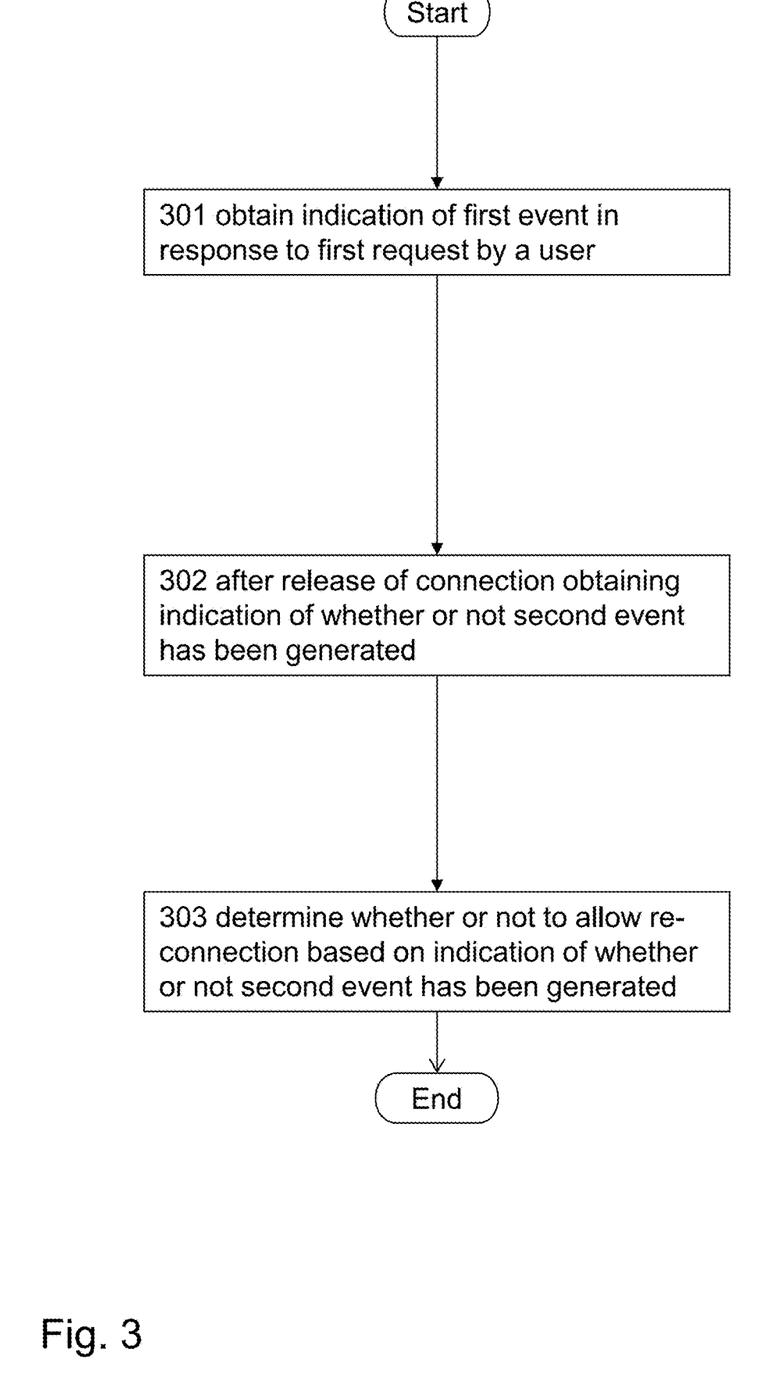
FIG. 3 is a flow chart illustrating a method performed by a control unit for handling a radio-frequency connection between a control unit and a mobile device of an access control system according to embodiments herein.

Embodiments will now be described briefly from the perspective of the control unit 110. FIG. 3 presents a flowchart for a method performed by the control unit 110. Here it is assumed that the control unit 110 makes the determination as to whether or not to allow the previously connected mobile device 120 to re-connect again.

Action 301

Action 301 relates to action 205 above. As mentioned above, the control unit 110 obtains an indication of the first event generated in the access control system 100 in response to the first request for the control unit 110 to arrange to carry out the action.

Action 302

Action 302 relates to action 211 above. After the release of the connection by the control unit 110, the control unit 110 obtains the indication of whether or not the second event has been generated in the access control system 100 in response to the second request for the control unit 110 to arrange to carry out the action. In order to keep track of the events, the indication of whether or not the second event has been generated may be implemented as the counter value of the counter of events.

Action 303

Action 303 relates to action 217 above. The control unit 110 determines based on the indication of whether or not the second event has been generated, whether or not to allow the previously connected mobile device 120 to re-connect to the control unit 110. In other words, if the second event has not been generated, then the control unit 110 determines to not allow the previously connected mobile device 120 to re-connect. If on the other hand the second event has been generated, then the control unit 110 may determine to allow the previously connected mobile device 120 to re-connect. Thus, the generation of the second event is a necessary requirement for allowing the previously connected mobile device 120 to re-connect to the control unit 110. However, the generation of the second event may not be a sufficient requirement. For example, the control unit 110 may apply further criteria when determining whether or not to allow the previously connected mobile device 120 to re-connect to the control unit 110. For example, the control unit 110 may determine whether or not to allow the previously connected mobile device 120 to re-connect further based on whether or not the control unit 110 can determine which presently connected mobile device 121-122 is associated with the second event. For example, if the control unit 110 cannot determine which presently connected mobile device 121-122 is associated with the second event then the control unit 110 determines to allow the previously connected mobile device 120 to re-connect to the control unit 110.

Figure 4:
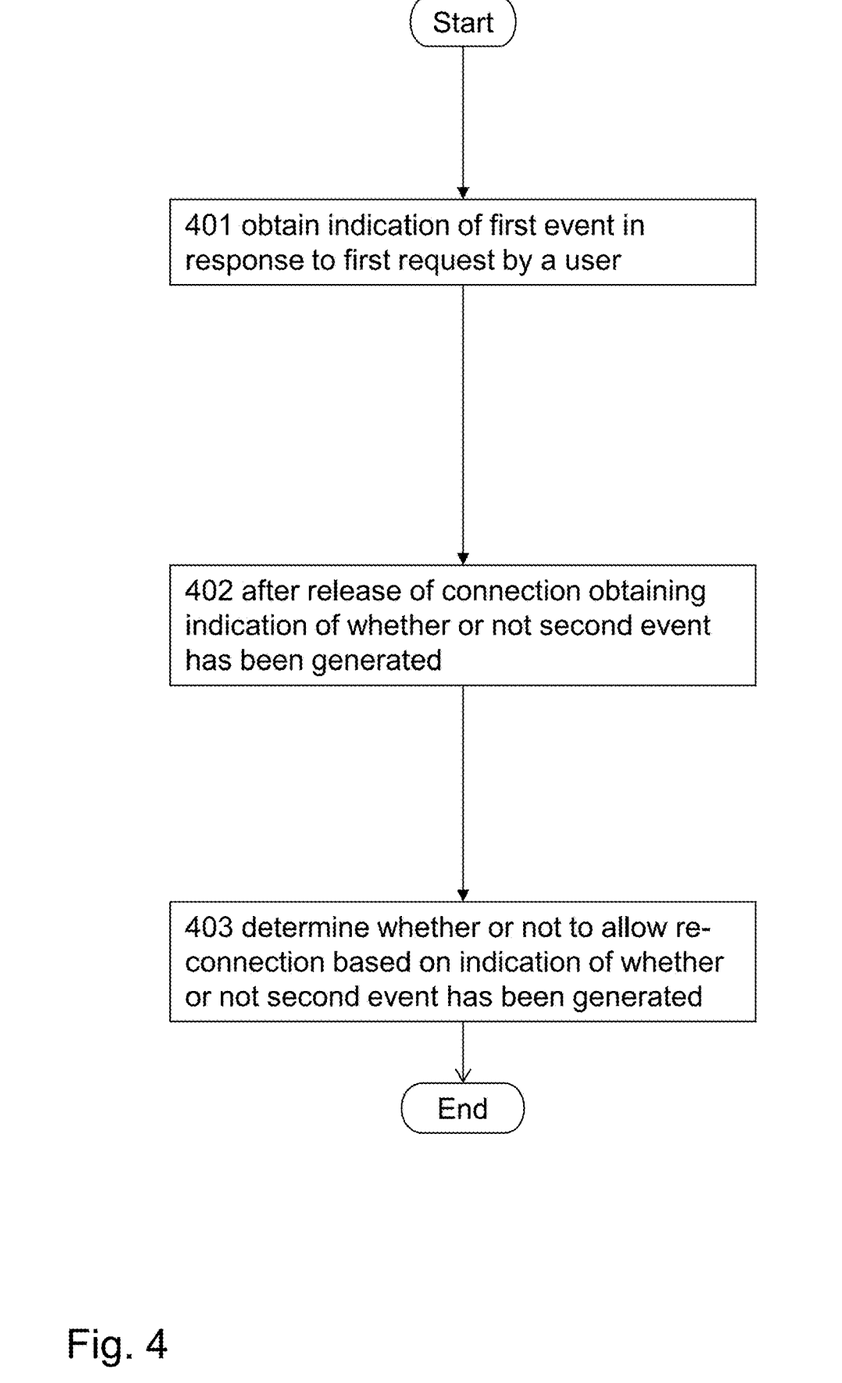
FIG. 4 is a flow chart illustrating a method performed by a mobile device for handling a radio-frequency connection between a control unit and a mobile device of an access control system according to embodiments herein.

Embodiments will now be described briefly from the perspective of the connected and eventually previously connected mobile device 120. FIG. 4 presents a flowchart for a method performed by the connected mobile device 120. Here it is assumed that the previously connected mobile device 120 makes the determination as to whether or not to allow the previously connected mobile device 120 to re-connect again.

Action 401

Action 401 relates to action 207 above. As mentioned above, the connected mobile device 120 obtains an indication of the first event generated in the access control system 100 in response to the first request for the control unit 110 to arrange to carry out the action. For example, the connected mobile device 120 may obtain the indication of the first event by receiving the broadcasted first counter value.

Action 402

Action 402 relates to action 213 above. After the release of the connection by the control unit 110, the previously connected mobile device 120 obtains the indication of whether or not the second event has been generated in the access control system 100 in response to the second request for the control unit 110 to arrange to carry out the action. For example, the previously connected mobile device 120 may obtain the indication of the second event by receiving the broadcasted second counter value.

Action 403

Action 403 relates to action 215 above. The now previously connected mobile device 120 determines, based on the indication of whether or not the second event has been generated, whether or not to allow the previously connected mobile device 120 to re-connect to the control unit 110. For example, the previously connected mobile device 120 may determine to allow re-connection to the control unit 110 if it receives the second counter value.

The method for handling the radio-frequency connection between the control unit 110 and the mobile device 120 of the access control system 100 may be implemented in any access control system, e.g. the access control system 100 shown in FIG. 1a and/or in FIG. 1b, for access control of a physical area, a logical area, a protected device, or a protected resource, etc. Thus, the access control system 100 is configured to handle the connection between the control unit 110 and the mobile device 120. As mentioned above, the access control system 100 comprises the control unit 110 and the mobile device 120 which is configured to be connected to the control unit 110 using radio-frequency signal communication.

Thus, the access control system 100 is configured to perform at least the embodiments described by carrying out the corresponding method actions as described above.

The access control system 100 is configured to generate the event in response to the request from a user of a mobile device requesting access to the physical area, to the content of the logical area, to the protected device or to the protected resource.

The generated event may be a result of a request issued by a user, requesting the control unit 110 to arrange access to a physical area, a logical area, a protected device, or a protected resource, etc. As shown in FIG. 1a and in FIG. 1b, the access control system 110 comprises a control unit 110 and one or more connected mobile devices 120-122. As mentioned above, a respective one of the one or more connected mobile devices 120-122 may be any one of a mobile phone, a tablet, a laptop, a key fob, a smart watch or a smart bracelet.

The control unit 110 may be any unit controlling access to a physical area, a logical area, a protected device, or a protected resource.

Embodiments of a control unit 600 will now be further described with reference to a schematic block diagram illustrated in FIG. 5, while embodiments of a connected mobile device 700 will be further described with reference to a schematic block diagram illustrated in FIG. 6. The control unit 600 corresponds to the control unit 110 of FIGS. 1a and 1b, while the connected mobile device 700 corresponds to the connected mobile device 120 of FIGS. 1a and 1b.

The control unit 600 and the connected mobile device 700 may each comprise a processing module 601, 701, such as a means for performing the methods described herein. The means may be embodied in the form of one or more hardware modules and/or one or more software modules The control unit 600 and the connected mobile device 700 may further each comprise a memory 602, 702. The memory may comprise, such as contain or store, instructions, e.g. in the form of a computer program 603, 703, which may comprise computer readable code units which when executed on the control unit 600 and/or the connected mobile device 700 causes the control unit 600 and/or the connected mobile device 700 to perform the methods above.

According to some embodiments herein, the control unit 600 and/or the connected mobile device 700 and/or the processing module 601,701 comprises a processing circuit 604, 704 as an exemplifying hardware module, which may comprise one or more processors. Accordingly, the processing module 601, 701 may be embodied in the form of, or 'realized by', the processing circuit 604, 704. The instructions may be executable by the processing circuit 604, 704, whereby the control unit 600 and/or the connected mobile device 700 is operative to perform the methods described above. As another example, the instructions, when executed by the control unit 600 and/or the connected mobile device 700 and/or the processing circuit 604, 704, may cause the control unit 600 and/or the connected mobile device 700 to perform the methods described above.

Figure 5:
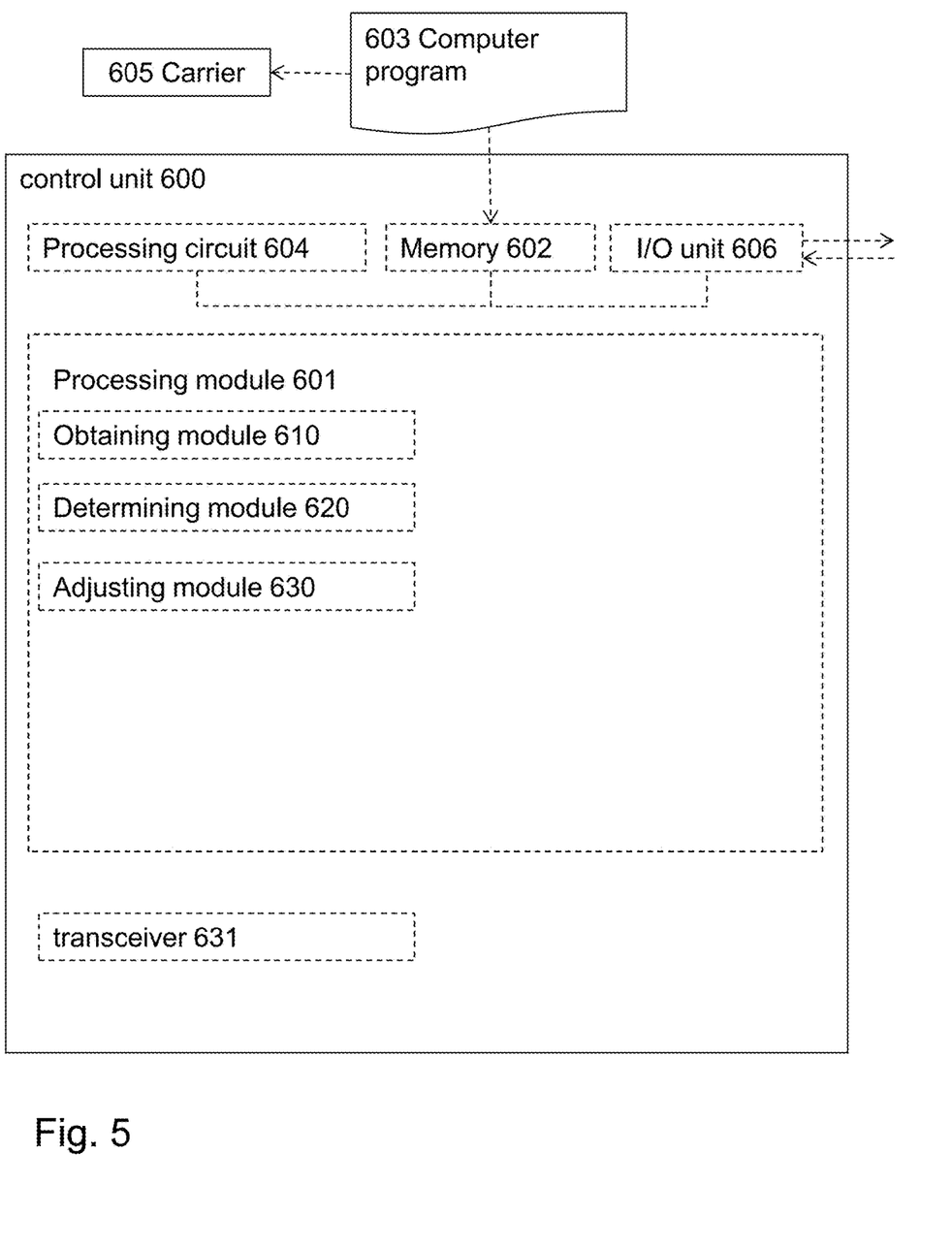
FIG. 5 is block diagram illustrating a control unit in which methods according to embodiments herein may be implemented.
Figure 6:
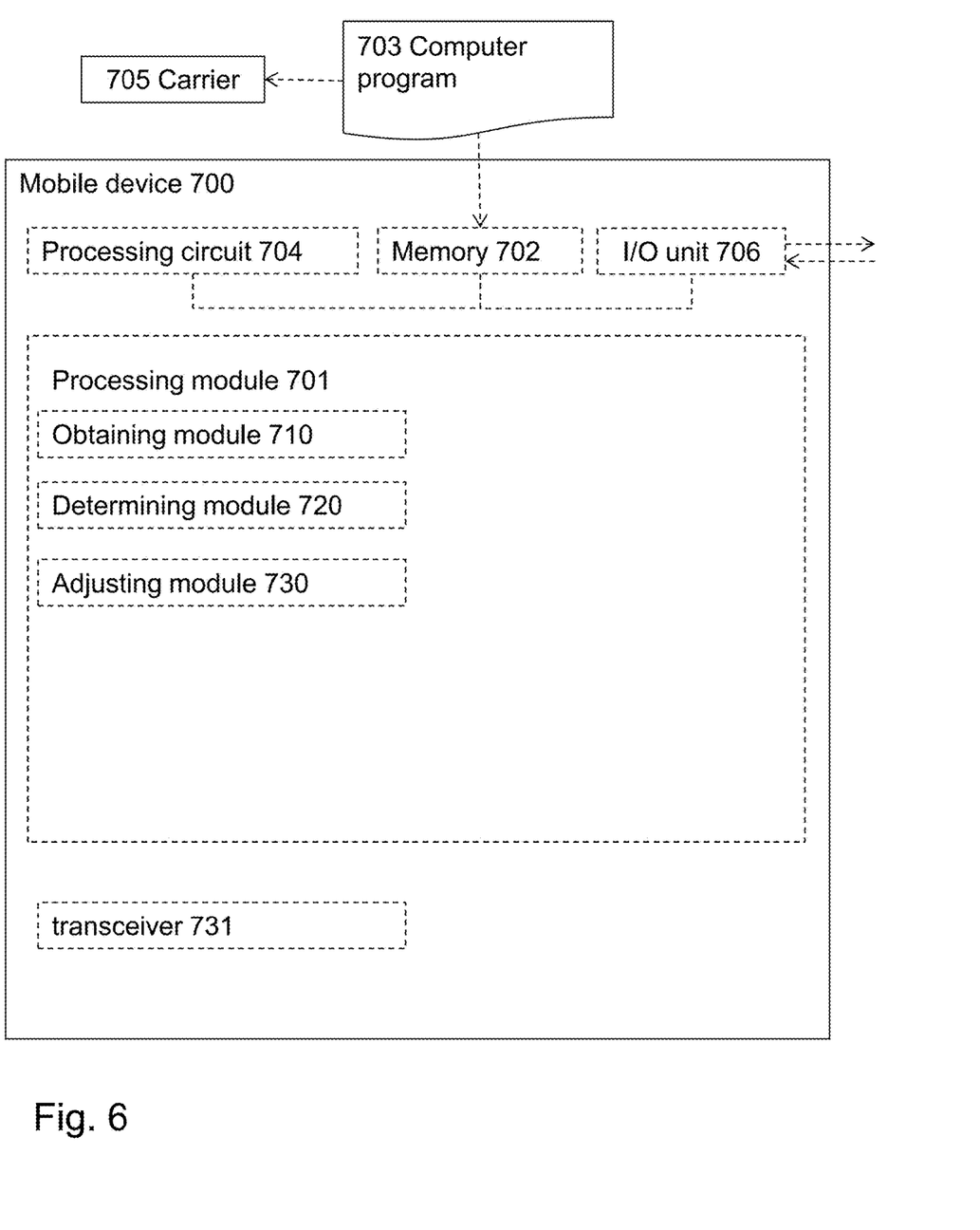
FIG. 6 is block diagram illustrating a mobile device in which methods according to embodiments herein may be implemented.

FIGS. 5 and 6 further illustrate a carrier 605, 705, or program carrier, which comprises the computer program 603, 703 as described directly above. The carrier 605, 705 may be one of an electronic signal, an optical signal, a radio signal and a computer readable medium.

In view of the above, in one example, the control unit 600 and the connected mobile device 700 is provided for handling the radio-frequency connection between the control unit 110 and the mobile device 120. Again, the memory 602, 702 contains the instructions executable by said processing circuit 604, 704 whereby the control unit 600 and/or the connected mobile device 700 is operative for performing the methods described above in relation to FIGS. 3 and 4.

The methods comprise obtaining the indication of the first event generated in the access control system in response to the first request for the control unit to arrange to carry out an action.

After the release of the connection by the control unit, the method further comprises obtaining an indication of whether or not the second event has been generated in the access control system in response to the second request for the control unit to arrange to carry out the action.

The method further comprises determining, based on the indication of whether or not the second event has been generated, whether or not to allow the mobile device to re-connect to the control unit.

The memory 602, 702 may further be used to store different counter values, such as first counter value and the second counter value, information about the connections, timers or time values relating to the re-connection of connections such as the pre-determined time duration etc.

In some embodiments, the control unit 600 and/or the connected mobile device 700 and/or the processing module 601, 701 may comprise one or more of an obtaining module 610, 710, a determining module 620, 720, an adjusting module 630, 730, and a radio-frequency transceiver 631, 731 as exemplifying hardware modules. In other examples, one or more of the aforementioned exemplifying hardware modules may be implemented as one or more software modules.

According to the various embodiments described above the control unit 600 and/or the mobile device 120 and/or the processing module 601, 701 and/or the obtaining module 610, 710 is configured to obtain the indication of the first event generated in the access control system in response to the first request for the control unit 110 to arrange to carry out the action.

After the release of the connection by the control unit 110, the control unit 600 and/or the mobile device 120 and/or the processing module 601, 701 and/or the obtaining module 610, 710 is further configured to obtain the indication of whether or not the second event has been generated in the access control system 100 in response to the second request for the control unit 110 to arrange to carry out the action.

The control unit 600 and/or the mobile device 120 and/or the processing module 601, 701 and/or the determining module 620, 720 is configured to determine based on the indication of whether or not the second event has been generated, whether or not to allow the mobile device 120 to re-connect to the control unit 110.

The control unit 600 and/or the mobile device 120 and/or the processing module 601, 701 and/or the adjusting module 630, 730 may be configured to adjusting the counter of events to the first counter value in response to the first event, and adjust the counter of events to the second counter value if the second event has been generated.

Moreover, the processing module 601, 701 may comprise an Input/Output unit 606, 706. According to an embodiment, the Input/Output unit 606 of the control unit 600 may comprise a command receiving unit, e.g. the request receiving unit 113.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method for handling a radio-frequency connection between a control unit and a mobile device of an access control system, wherein the control unit is limited to a maximum number of multiple simultaneous radio-frequency connections to mobile devices, the method comprising:
    establishing, by the control unit and the connected mobile device, the radio-frequency connection between the mobile device and the control unit in response to the mobile device being able to communicate with the control unit; wherein the method is characterized by:
    obtaining, by the control unit, an indication of a first event generated in the access control system by the control unit in response to a first request for the control unit to arrange to carry out an action, wherein the indication of the first event is obtained when the mobile device is connected;
    after a release of the connection by the control unit,
    obtaining, by the control unit, within a pre-determined time duration from the release of the connection, during which pre-determined time duration the mobile device is prohibited from re-connecting to the control unit unless a second event has been generated in the access control system during the pre-determined time duration in response to a second request for the control unit to arrange to carry out the action, an indication of whether or not the second event has been generated; and
    determining, by the control unit, based on the indication of whether or not the second event has been generated, whether or not to allow the mobile device to re-connect to the control unit within the pre-determined time duration from the release of the connection.

2. The method according to claim 1, wherein determining whether or not to allow the mobile device to re-connect to the control unit comprises:
    determining to allow the mobile device to re-connect to the control unit if the indication of whether or not the second event has been generated indicates that the second event has been generated.

3. The method according to claim 1, wherein the control unit is a door station and wherein the first event and the second event each indicates a door opening command received by the door station.

4. The method according to claim 1, further comprising:
    broadcasting, by the control unit, the indication of whether or not the second event has been generated.

5. The method according to claim 4, wherein the respective indication of the first and second events comprises a respective counter value corresponding to the respective event, the method further comprising:
    adjusting, by the control unit, a counter of events to the first counter value in response to the first event;
    broadcasting, by the control unit, the first counter value;
    adjusting, by the control unit, the counter of events to the second counter value if the second event has been generated;
    wherein broadcasting the indication of whether or not the second event has been generated comprises broadcasting the second counter value, and wherein determining whether or not to allow the mobile device to re-connect to the control unit comprises determining, based on the value of the counter of events, to allow the mobile device to re-connect to the control unit if the value of the counter of events has been adjusted to the second counter value.

6. The method according to claim 1, further comprising receiving, by the control unit, a connection request from the mobile device, and wherein determining whether or not to allow the mobile device to re-connect to the control unit is performed by the control unit.

7. A method for handling a radio-frequency connection between a control unit and a mobile device of an access control system, wherein the control unit is limited to a maximum number of multiple simultaneous radio-frequency connections to mobile devices, the method comprising:
    establishing, by the control unit and the connected mobile device, the radio-frequency connection between the mobile device and the control unit in response to the mobile device being able to communicate with the control unit, wherein the method is characterized by:
    obtaining, by the connected mobile device, an indication of a first event generated in the access control system by the control unit in response to a first request for the control unit to arrange to carry out an action, wherein the indication of the first event is obtained when the mobile device is connected to the control unit;
    after a release of the connection by the control unit:
    obtaining, by the connected mobile device, within a pre-determined time duration from the release of the connection, during which pre-determined time duration the mobile device is prohibited from re-connecting to the control unit unless a second event has been generated in the access control system during the pre-determined time duration in response to a second request for the control unit to arrange to carry out the action, an indication that the second event has been generated; and
    determining, by the connected mobile device, based on the indication of whether or not the second event has been generated, whether or not to allow the mobile device to re-connect to the control unit within the pre-determined time duration from the release of the connection.

8. The method according to claim 7, wherein obtaining the indication of whether or not the second event has been generated comprises receiving the indication by the mobile device, wherein the indication of whether or not the second event has been generated is received in a broadcasted message from the control unit, and wherein determining whether or not to allow the mobile device to re-connect to the control unit comprises determining, by the mobile device, whether or not to send a connection request.

9. The method according to claim 1, wherein the release of the connection by the control unit is performed in response to not being able to determine which connected mobile device out of one or more connected mobile devices that is associated with the first event.

10. The method according to claim 1, wherein the release of the connection by the control unit is performed if the number of connected mobile devices is larger than a maximum number of mobile devices allowed to connect to the control unit simultaneously.

11. The method according to claim 1, wherein the event generated in the access control system is a result of a request given by a user of a mobile device out of one or more mobile devices.

12. The method according to claim 1, further comprising:
selecting, by the control unit, the radio-frequency connection between the mobile device and the control unit to be released by selecting a connection to be released among one or more connections between the control unit and the one or more connected mobile devices based on which connection that was established first.

13. An access control system configured to perform the method according to claim 1, wherein the access control system comprises a control unit and a mobile device which is configured to be connected to the control unit using radio-frequency signal communication.

14. The access control system according to claim 13, wherein the mobile device is any one of a mobile phone, a tablet, a laptop, a key fob, a smart watch or a smart bracelet, wherein the control unit is any unit controlling access to a physical area, a logical area, a protected device, or a protected resource, and wherein the access control system is configured to generate an event in response to a request from a user of a mobile device requesting access to the physical area, to the content of the logical area, to the protected device or to the protected resource.

15. A computer program, comprising computer readable code units which when executed on an access control system causes the access control system to perform the method according to claim 1.

16. A method, performed by a control unit of an access control system, for handling a radio-frequency connection between the control unit and a mobile device of the access control system, wherein the control unit is limited to a maximum number of multiple simultaneous radio-frequency connections to mobile devices, the method comprising:
  establishing, by the control unit, the radio-frequency connection between the mobile device and the control unit in response to the mobile device being able to communicate with the control unit; wherein the method is characterized by:
  obtaining an indication of a first event generated in the access control system by the control unit in response to a first request for the control unit to arrange to carry out an action, wherein the indication of the first event is obtained when the mobile device is connected to the control unit;
  releasing the radio-frequency connection between the mobile device and the control unit; and characterized by:
  broadcasting within a pre-determined time duration from the release of the connection, during which pre-determined time duration the mobile device is prohibited from re-connecting to the control unit unless a second event has been generated in the access control system during the pre-determined time duration in response to a second request for the control unit to arrange to carry out the action, an indication of whether or not the second event has been generated in the access control system.

* * * * *